United States Patent
Garrec

(10) Patent No.: US 12,379,021 B2
(45) Date of Patent: Aug. 5, 2025

(54) ASYMMETRIC-LOOP CABLE CYLINDER

(71) Applicant: COMMISSARIAT A L'ENERGIE ATOMIQUE ET AUX ENERGIES ALTERNATIVES, Paris (FR)

(72) Inventor: Philippe Garrec, Palaiseau (FR)

(73) Assignee: COMMISSARIAT A L'ENERGIE ATOMIQUE ET AUXENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/855,397

(22) PCT Filed: May 10, 2023

(86) PCT No.: PCT/EP2023/062513
§ 371 (c)(1),
(2) Date: Oct. 9, 2024

(87) PCT Pub. No.: WO2023/222489
PCT Pub. Date: Nov. 23, 2023

(65) Prior Publication Data
US 2025/0116319 A1    Apr. 10, 2025

(30) Foreign Application Priority Data
May 18, 2022   (FR) ...................................... 2204755

(51) Int. Cl.
*F16H 37/12*   (2006.01)
(52) U.S. Cl.
CPC .................................. *F16H 37/122* (2013.01)
(58) Field of Classification Search
CPC ...................... F16H 37/122; F16H 2025/2043
See application file for complete search history.

(56) References Cited

U.S. PATENT DOCUMENTS

| 1,218,778 A * | 3/1917 | Johnson ................ F16H 37/122 |
| | | 74/17 |
| 2011/0056321 A1 | 3/2011 | Sim et al. |

(Continued)

FOREIGN PATENT DOCUMENTS

| FR | 3115084 A1 | 4/2022 |
| WO | 2023/222489 A1 | 11/2023 |

OTHER PUBLICATIONS

International Search Report for PCT/EP2023/062513 dated Aug. 4, 2023 (PCT/ISA/210).

(Continued)

*Primary Examiner* — Terence Boes
(74) *Attorney, Agent, or Firm* — Sughrue Mion, PLLC

(57) ABSTRACT

A cable cylinder having a screw rotatable by a motor, a nut cooperating with the screw to move in the body, the cable cylinder having a pair of upstream and downstream pulleys on either side of the nut. In at least one of the pairs, the pulleys are rotationally secured to one another. The two cables each cooperating with one of the upstream cables and one of the downstream cables to define strands parallel to the screw rotational axis and attached to the nut. One of the cables forms a loop while the other extends beyond its downstream pulley to cooperate with a remote pulley rotatably mounted about a separate axis of rotation, the remote pulley forming a return to return the extended cable to the upstream pulley, the extended cable prevented from sliding over its upstream or associated downstream pulley that is rotationally engaged.

13 Claims, 12 Drawing Sheets

(56) References Cited

U.S. PATENT DOCUMENTS

2021/0262876 A1 8/2021 Garrec
2023/0175575 A1* 6/2023 Garrec ............... F16H 25/2015
　　　　　　　　　　　　　　　　　　　　74/89.2

OTHER PUBLICATIONS

Written Opinion for PCT/EP2023/062513 dated Aug. 4, 2023 (PCT/ISA/237).

* cited by examiner

ASYMMETRIC-LOOP CABLE CYLINDER

The invention relates to cable cylinders.

CROSS REFERENCE TO RELATED APPLICATIONS

This application is a National Stage of International Application No. PCT/EP2023/062513 filed May 10, 2023, claiming priority based on French Patent Application No. 2204755 filed May 18, 2022.

BACKGROUND OF THE INVENTION

A cylinder with two cables of identical lengths is known, for example, from document FR-A-3070062. As illustrated in FIG. 1, which is a schematic, perspective view of a cable cylinder according to the prior art, the latter comprises a body 1 in which a screw 2 is rotatably mounted so as to rotate about a longitudinal axis of rotation X1, by being selectively driven by a motor 3. A nut 4 cooperates with the screw 2 so as to move in the body 1 due to the rotational movement of the screw. The cylinder comprises two cables 10a, 10b forming loops between respective upstream 11a, 11b and downstream 12a, 12b pulleys, so as to define, for each cable, strands that are parallel to the axis of rotation X1, which are attached to the nut 4 on diametrically opposite respective attachment points. The upstream 11a, 11b and downstream 12a, 12b pulleys of each cable 10a, 10b are rotatably mounted so as to rotate about respective axes of rotation Z1, Z2 which are parallel to one another and both perpendicular to the longitudinal axis of rotation X1. To synchronise the cables 10a, 10b, at least one of the pairs of pulleys (in this case, the upstream pulleys 11a, 11b) comprises a synchronisation shaft 13 to rotatably secure the pulleys. The cables 10a and 10b are prevented from sliding over at least one of the rotatably secured pulleys, which can thus transmit the movement and the torque to a segment or accessory. Preventing the sliding of the cable over the pulley can be obtained, for example, by anchoring the cable on the pulley, or also by means of a round turn around it. These pulleys will be called proximal insofar as they are articulated in the proximity of the nut 4, in this case, directly on the body 1. In a variant illustrated in FIG. 2, the cables 10a, 10b are not directly attached to the nut 4, but indirectly through coupling rings 14, 15 arranged around the screw 2 on either side of the nut 4 to which the cables 10a, 10b are attached, the coupling rings each being attached to the nut by two respective tie rods 16, 17. As can be seen in FIG. 3, the tie rods 17 attaching the ring 15 to the nut 4 are diametrically oppositely arranged. On each coupling ring 14, 15, the attachment points of the tie rods and the attachment points of the cables are, in this case, arranged at 90 degrees from one another (this arrangement is however not necessary, and another angular arrangement is possible). Thus, the coupling rings 14, 15 behave like gimbals adapted to absorb misalignments of the cables 10a, 10b, or non-axial movements of the nut 4 during its axial movement.

When, as illustrated, the distance between the upstream 11a, 11b and downstream 12a, 12b pulleys of one same cable 10a, 10b is sufficiently small to ensure a significant bending rigidity of the strands of the cables 10a, 10b extending between the pulleys and the nut 4, it is possible to avoid using a specific anti-rotation member of the nut 4, the bending rigidity of the strands of the cables 10a, 10b limiting the rotation of the nut 4 and fulfilling the anti-rotation function. This arrangement considerably simplifies the design of these types of cylinders. Thus, with or without use of coupling rings, using two cables makes it possible for a considerable simplification of the guiding of the nut 4.

These cable cylinders can be used to move a load attached to one or to the two cables, or to make an accessory secured to one of the pulleys rotate. In particular, these cylinders are typically used to actuate the phalanges of the fingers of a robotic hand.

The question is thus posed of using one of these cylinders to make an accessory rotatably mounted so as to rotate about a axis remote from the cylinder rotate. It would naturally be possible to distance one of the downstream pulleys, to make it rotate about the remote axis, by extending the corresponding cable, the downstream pulley thus distanced, acting as a remote pulley secured to the accessory. However, this distance would make the bending rigidity of the cable thus extended collapse, thus compromising the anti-rotation of the nut of the cylinder only by means of the cables, and obligating the reintegration of a specific anti-rotation member.

AIM OF THE INVENTION

The invention aims to propose an arrangement making it possible to use such a cylinder to cause the rotation of accessories, the axis of rotation of which is remote from the cylinder, while preserving the anti-rotation of the nut of the cylinder ensured by the cables.

SUMMARY OF THE INVENTION

In view of achieving this aim, a cylinder is proposed, comprising a body in which a screw is rotatably mounted so as to rotate about a longitudinal axis by being selectively driven by a motor, a nut cooperating with the screw so as to move in the body due to the rotational movement of the screw, the cylinder comprising a pair of downstream pulleys and a pair of upstream pulleys arranged on either side of the nut, such that in at least one of the pairs, the pulleys are rotationally secured to one another, and two cables, each cooperating with one of the upstream pulleys and one of the downstream pulleys, so as to define, for each cable, strands that are parallel to the axis of rotation of the screw, which are attached to the nut. According to the invention, one of the cables forms a loop between its upstream pulley and its downstream pulley, while the other of the cables is extended beyond its downstream pulley to cooperate with a remote pulley rotatably mounted so as to rotate about a remote axis of rotation separate from the axis of rotation of the downstream pulley, the remote pulley forming a return to return the extended cable to the upstream pulley, the extended cable being prevented from sliding over that of the upstream or associated downstream pulley that is rotationally secured.

Preventing the sliding of the extended cable over the pulley rotationally secured can be obtained, for example, by anchoring the cable on the pulley, or also by means of a round turn around it. By round turn around a pulley, this means that the cable is wound around said pulley along a sufficient angular sector (typically at least a three-quarter turn) to prevent any sliding of the cable on said pulley.

In particular, if the extended cable is prevented from sliding over its downstream pulley, the extended cable makes it possible to rotate the remote pulley, while preserving the bending rigidity of the extended cable portion which extends between the nut and the downstream pulley, preserving the anti-rotation function of the nut ensured by the two cables.

The strand of the extended cable extending between the remote pulley and the upstream pulley can directly reach the upstream pulley, or also be guided by an auxiliary pulley, by making, if necessary, a round turn around it. In this case, the auxiliary pulley can be rotatably mounted so as to rotate about the same axis of rotation as the downstream pulley.

Other features and advantages of the invention will appear upon reading the description below, of particular, non-limiting embodiments of the invention.

BRIEF DESCRIPTION OF THE DRAWING

Reference will be made to the figures of the accompanying drawings, among which.

DETAILED DESCRIPTION OF THE INVENTION

Figure 1:
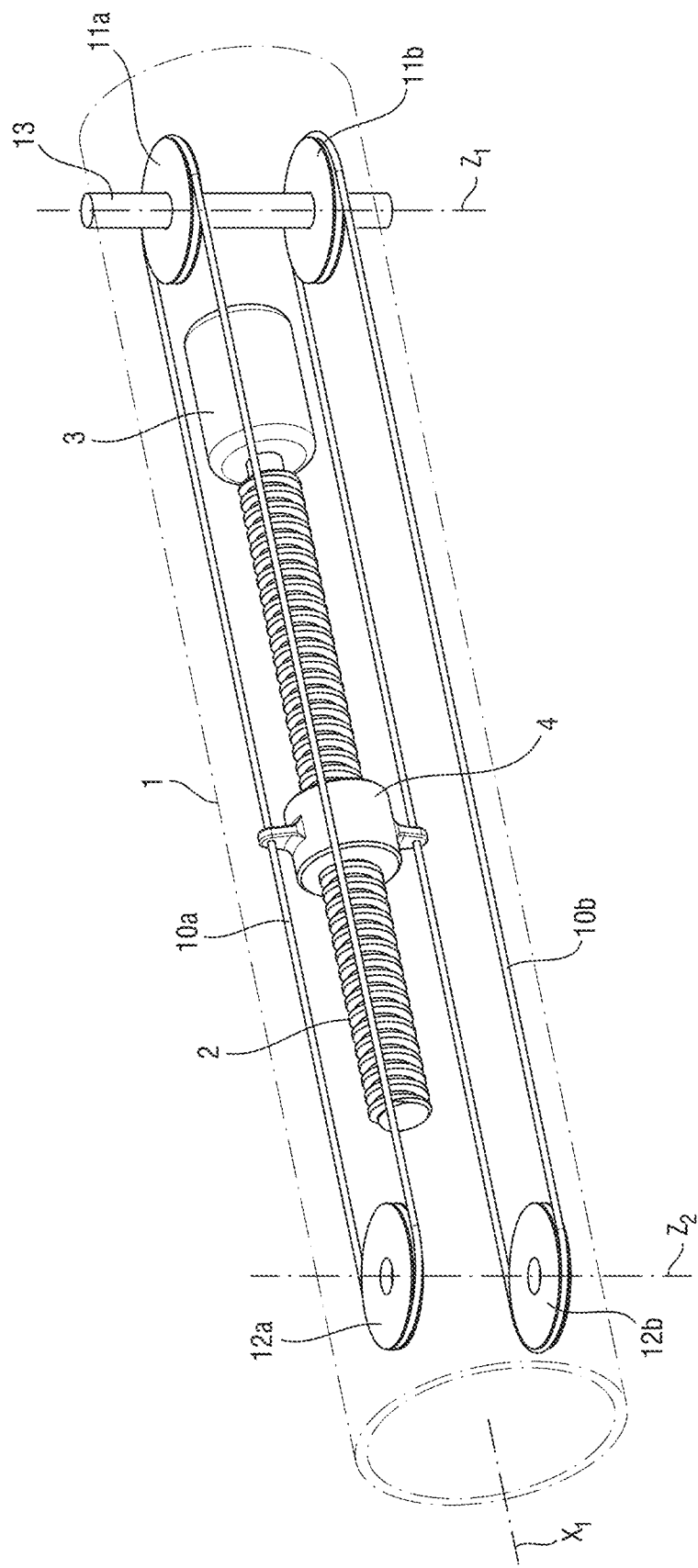
FIG. 1, already mentioned, is a schematic, perspective view of a cable cylinder according to the prior art, the body of the cylinder being simply outlined to show the inside.
Figure 2:
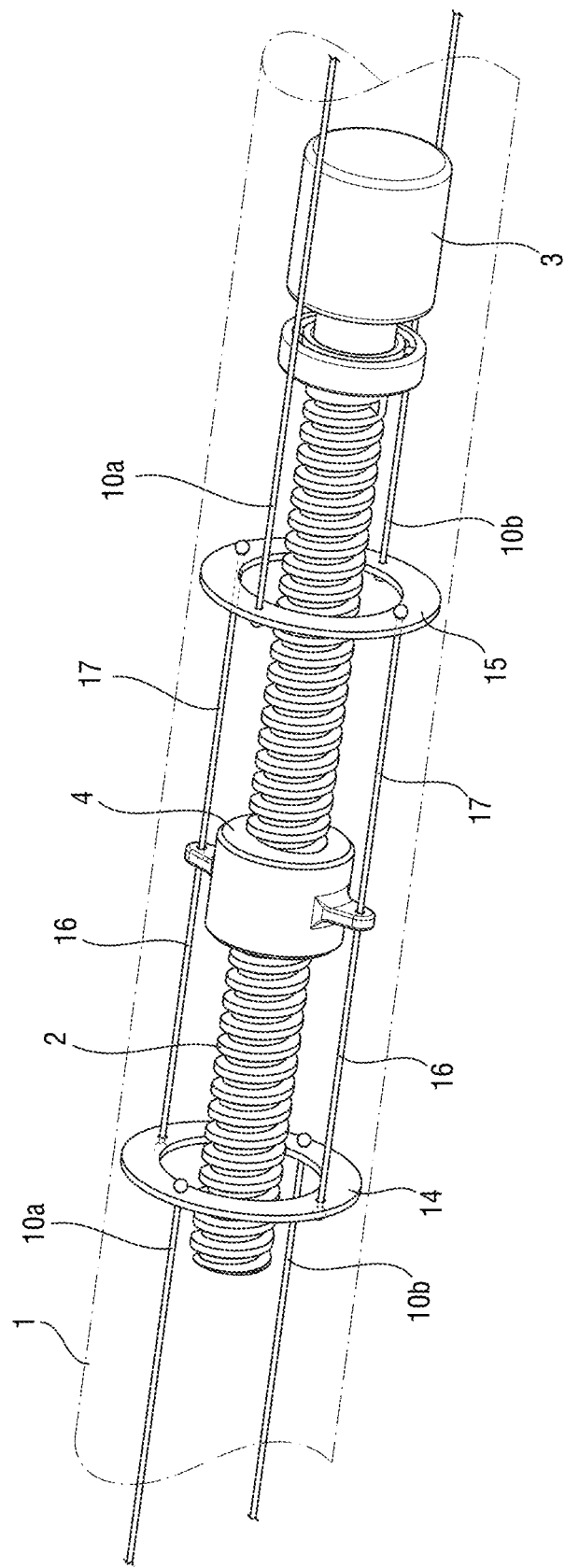
FIG. 2, already mentioned, is a partial, schematic, perspective view of a variant of a cable cylinder of FIG. 1, according to the prior art.
Figure 3:
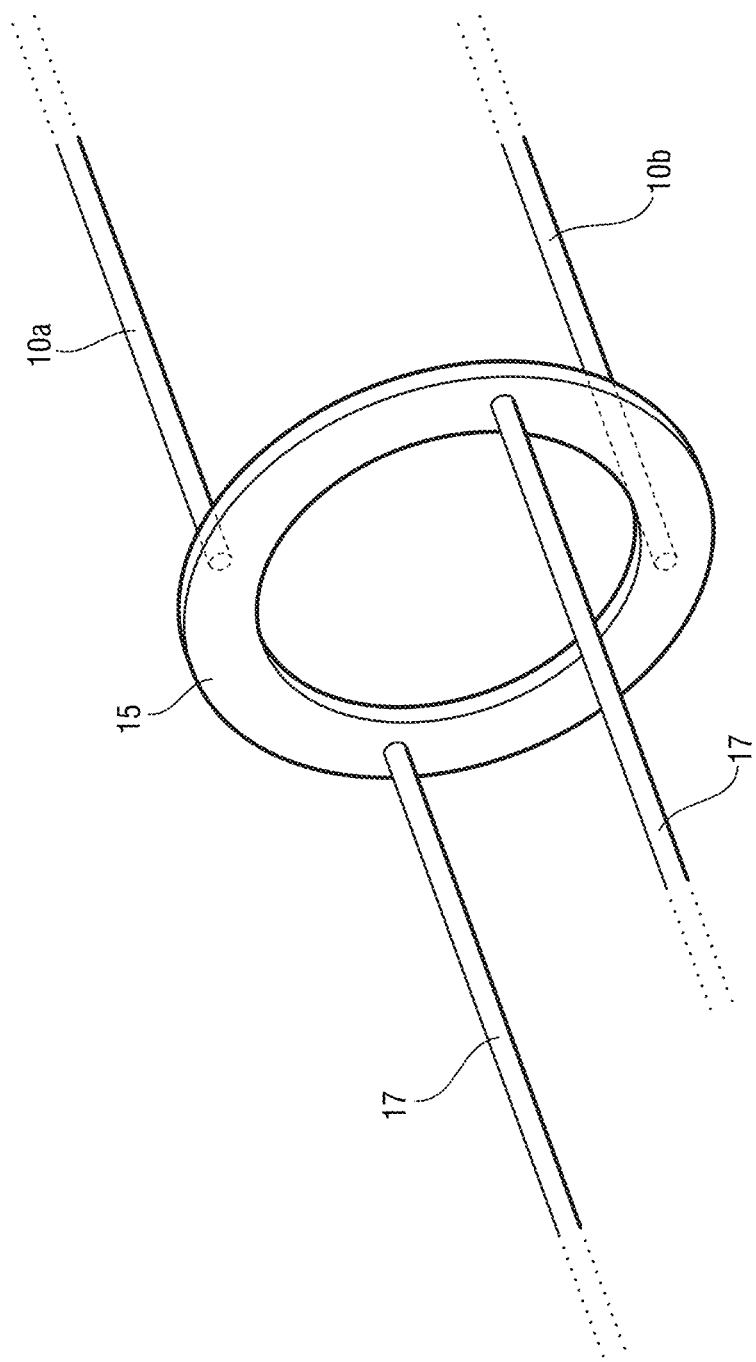
FIG. 3, already mentioned, is a schematic, perspective view of one of the coupling rings equipping the cable cylinder of FIG. 2.
Figure 4:
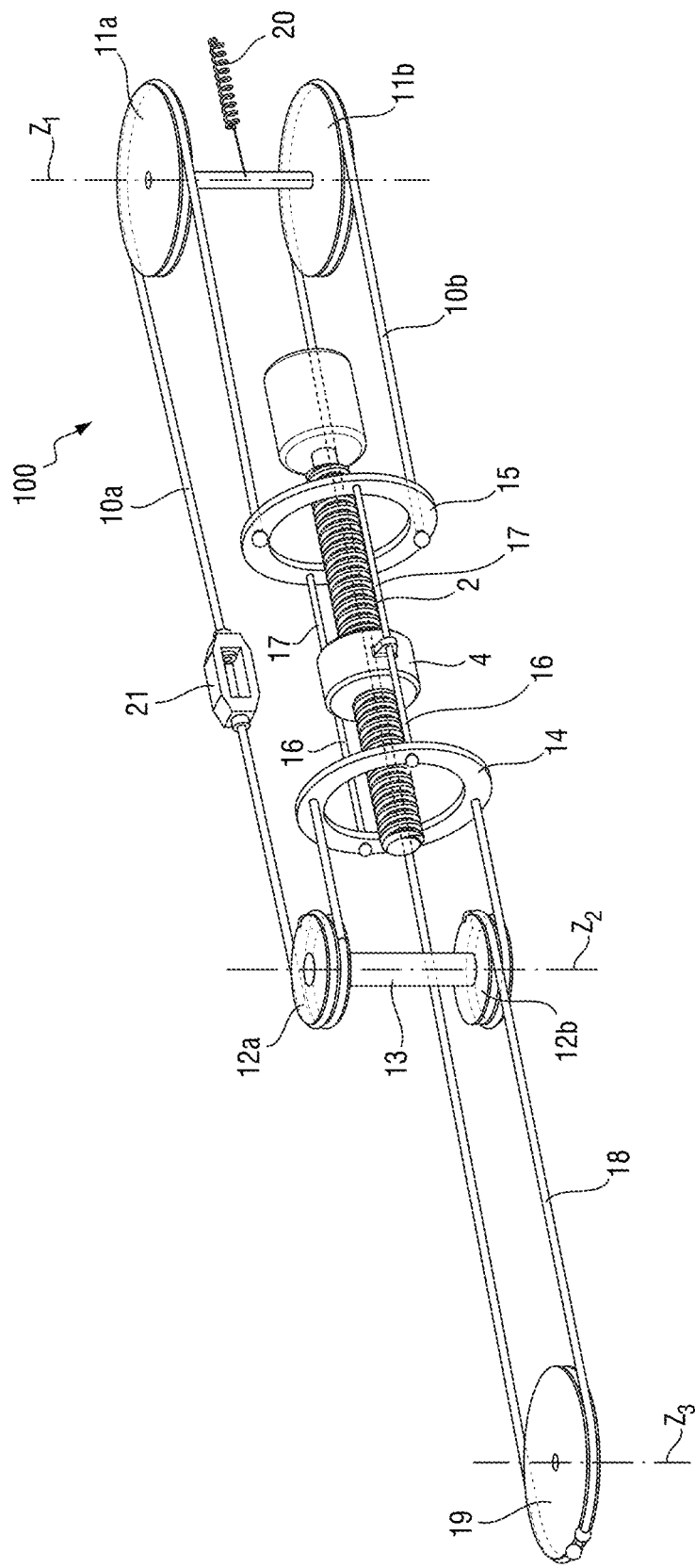
FIG. 4 is a schematic, perspective view of a cable cylinder according to a first particular embodiment of the invention, the cylinder body having been omitted for more clarity.

FIG. 4 and the following figures which describe particular embodiments of the asymmetric cable cylinder according to the invention have been simplified. In all these figures, the screw 2, the nut 4, the coupling rings 14, 15 attached to the nut 4 by the tie rods 16, 17 which connect the coupling rings 14, 15 to one another and to the nut 4 are recognised, like on the cylinders of the prior art described in FIGS. 1 to 3. The cables 10a, 10b, and the pairs of upstream 11a, 11b and downstream 12a, 12b pulleys on which the cable form loops are also recognised.

A first particular embodiment of the invention is illustrated in FIG. 4. According to an essential aspect of the invention, one of the cables, in this case, the cable 10b, has been extended beyond the downstream pulley 12b to have a strand 18 extending to a remote pulley 19 having an axis of rotation Z3 separate parallel to the axes of rotation Z1, Z2, to cooperate with the remote pulley 19 and rotationally actuate it. The remote pulley 19 forms a return to return the cable 10b to its upstream pulley 11b. Below, the cable 10b will be called the long cable or the extended cable, and the other cable 10a will be called the short cable. Thus, the cable cylinder of the invention is asymmetric in that the two cables have separate lengths.

In this case, the downstream pulleys 12a, 12b are rotationally secured by a synchronisation shaft 13. According to an essential aspect of the invention, the long cable 10b is prevented from sliding over the downstream pulley 12b by making it make a round turn around the downstream pulley 12b before forming the strand 18 extending to the remote pulley 19. This arrangement makes it possible to keep the long cable 10b portion which extends between the downstream pulley 12b and the ring 14 as tense as possible, thus preserving the bending rigidity necessary for the anti-rotation of the nut 4. The cable portion 18 extending between the downstream pulley 12b and the remote pulley 19 can thus have a considerable length, without bringing into question the anti-rotation of the nut 4. If, however, this length was excessive, an auxiliary pulley can be used to guide this cable portion.

To preserve the bending rigidity which depends on the tension of the cables, the upstream pulleys 11a, 11b are pivotably mounted on a common rotating shaft which has a small freedom of movement parallel to the axis of the screw 2, and a tensioner 20 has been arranged to move the common rotating shaft of the upstream pulleys 11a, 11b and thus cause an initial extension of the cables which is sufficient to keep the necessary rest tension in the portions of the cables 10a, 10b extending between the upstream 11a, 11b and downstream 12a, 12b pulleys and the coupling rings 14, 15. Alternatively to this solution, a rigging screw 21 placed, in this case, on the short cable 10a makes it possible, by extending the cable, to achieve the same result.

It will be noted that the short cable 10a, in this case, also makes a round turn around the downstream pulley 12a, which prevents it from sliding over its pulleys 12a, 11a. More generally, round turns of the two cables can be provided on their upstream and downstream pulleys rotationally secured to one another to prevent any sliding of the cables over said pulleys and thus synchronise the two cables.

Figure 5:
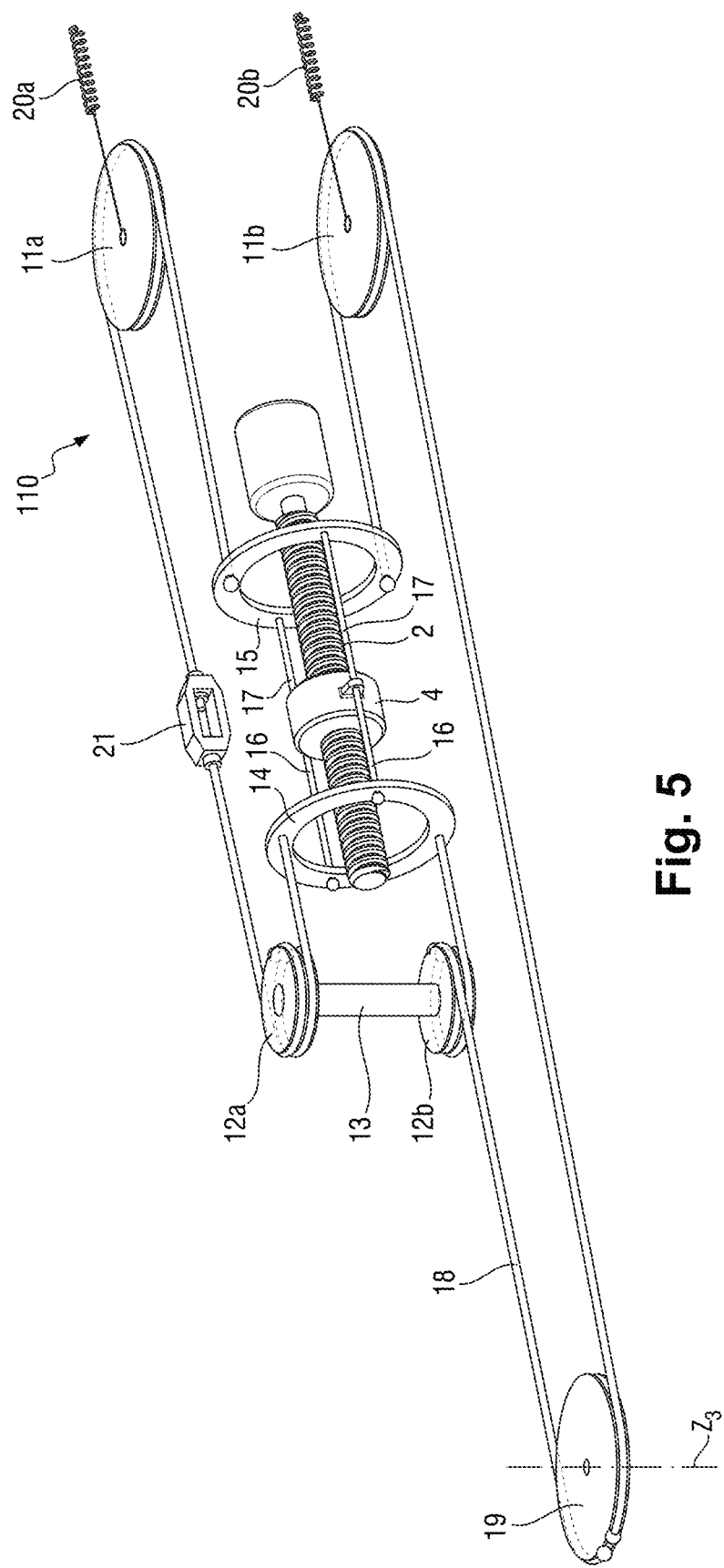
FIG. 5 is a schematic, perspective view of a cable cylinder according to a first variant of the embodiment of the cylinder of FIG. 4.

According to the first variant illustrated in FIG. 5, on which identical elements have identical references, the cable cylinder 110 comprises upstream pulleys 11a, 11b which are no longer mounted on a common rotating shaft, but one of them of which is equipped with a tensioner 20a or 20b to move the axis of rotation from one of the upstream pulleys 11a or 11b in parallel with the axis of the screw 2, which causes a sufficient initial extension to keep the necessary rest tension in the portions of the cables 10a, 10b extending between the upstream 11a, 11b and downstream 12a, 12b pulleys and the coupling rings 14, 15. Alternatively to this solution, a rigging screw 21 placed, in this case, on the short cable 10a makes it possible, by extending this cable, to achieve the same result. It will be noted that in this figure, the axis of rotation of the remote pulley 19 and the axis of rotation of the upstream pulley 11b have been laterally offset.

Figure 6:
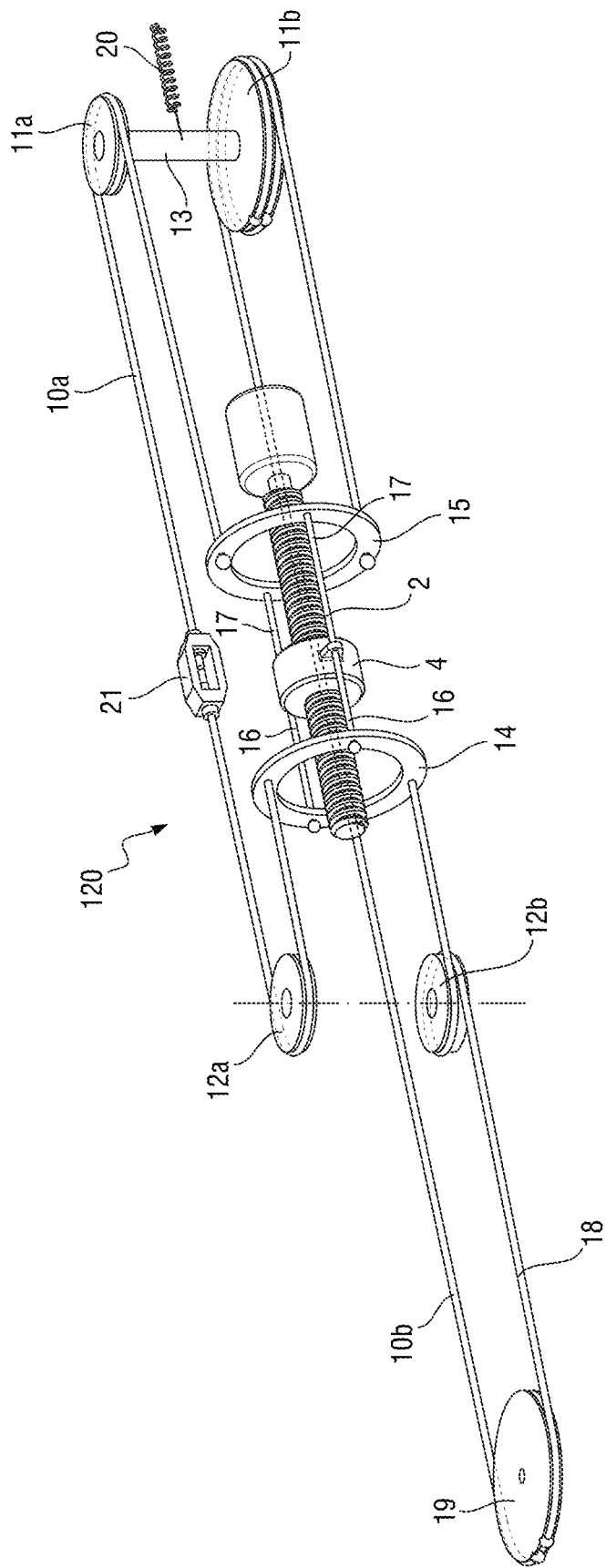
FIG. 6 is a schematic, perspective view of a cable cylinder according to a second variant of the embodiment of the cylinder of FIG. 4.

According to the second variant illustrated in FIG. 6, the cable cylinder 120 comprises a synchronisation shaft 13 which is now arranged to secure the upstream pulleys 11a, 11*b*, while the tensioner 20 is arranged to move the synchronisation shaft 13 to cause a sufficient initial extension and keep the necessary rest tension in the cables 10*a*, 10*b* (such that the tensioner 20 does not impede the rotation of the synchronisation shaft 13, the tensioner will act, for example, on a sleeve mounted to pivot around the synchronisation shaft 13). Alternatively to this solution, a rigging screw 21 placed, in this case, on the short cable 10*a* makes it possible, by extending this cable, to achieve the same result.

Figure 7:
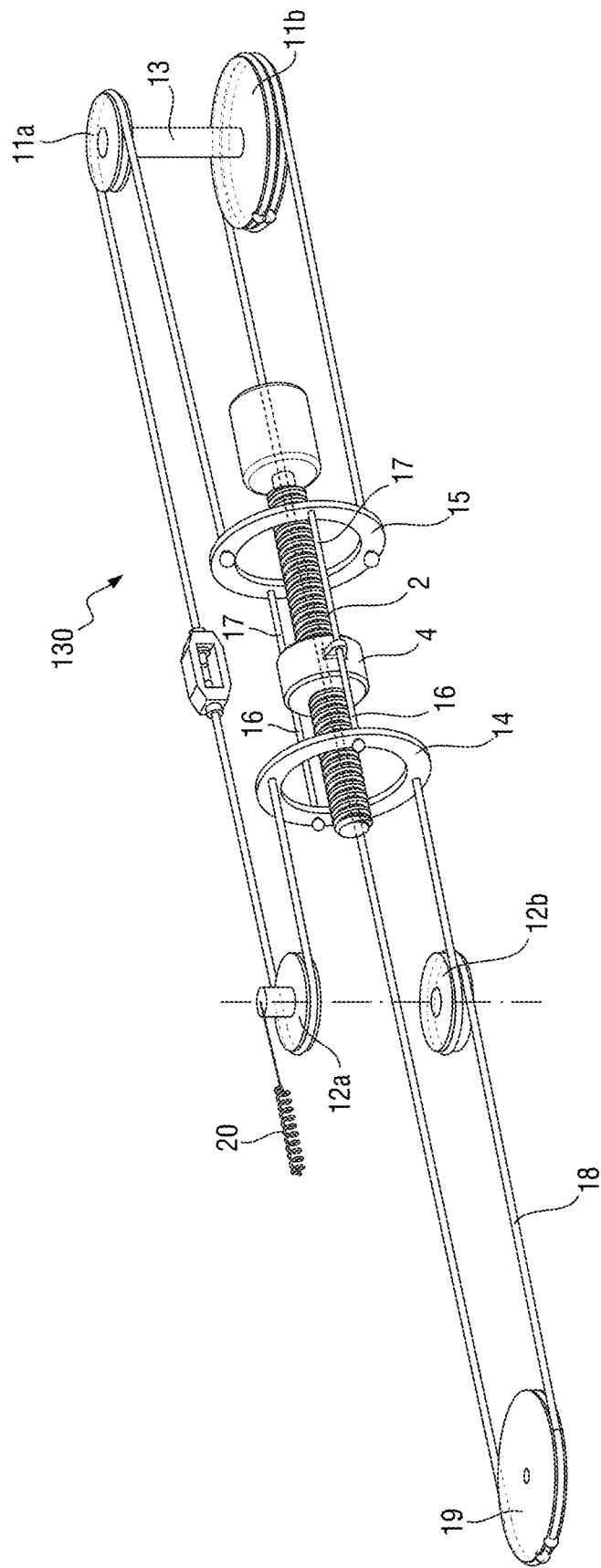
FIG. 7 is a schematic, perspective view of a cable cylinder according to a third variant of the embodiment of the cylinder of FIG. 4.

According to the third variant illustrated in FIG. 7, the cable cylinder 130 comprises a synchronisation shaft 13 which is still arranged to secure the upstream pulleys 11*a*, 11*b*, while the tensioner 20 is arranged to pull on the downstream pulley 12*a* of the short cable 10*a* and cause a sufficient initial extension to keep the necessary rest tension. Alternatively to this solution, a rigging screw 21 placed, in this case, on the short cable 10*a* makes it possible, by extending this cable, to achieve the same result.

Figure 8:
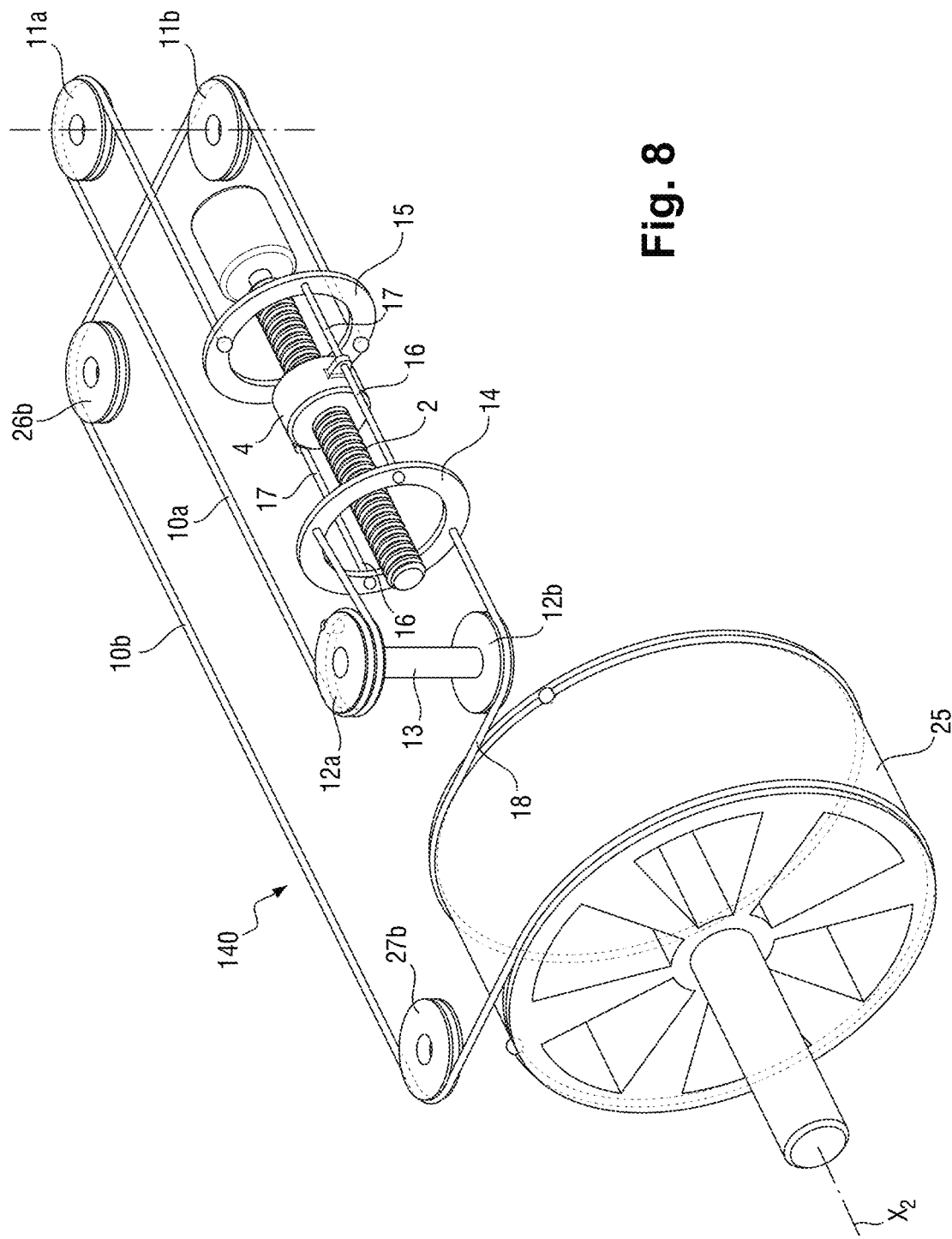
FIG. 8 is a schematic, perspective view of a cable cylinder according to a second particular embodiment of the invention, the cylinder body having been omitted for more clarity.

In the second particular embodiment of the invention illustrated in FIG. 8, the cable cylinder 140 of the invention is used to actuate a remote pulley 25 rotatably mounted, in this case, so as to rotate about an axis of rotation X2 that is parallel to the axis of rotation X1 of the screw 2. The same elements still having the same references as in the other figures, it can be seen in FIG. 8 that the downstream pulley 12*b* serves as an angle gear for the strand 18 which extends the long cable 10*b* beyond the downstream pulley 12*b* and which is wound over the remote pulley 25. As regards the upstream pulley 11*b*, it also serves as an angle gear to send the long cable 10*b* to the pulley 25 to be wound there in the other direction, by passing through two auxiliary return pulleys 26*b*, 27*b*. In this case, the downstream pulleys 12*a*, 12*b* are secured to one another by the synchronisation shaft 13.

Figure 9:
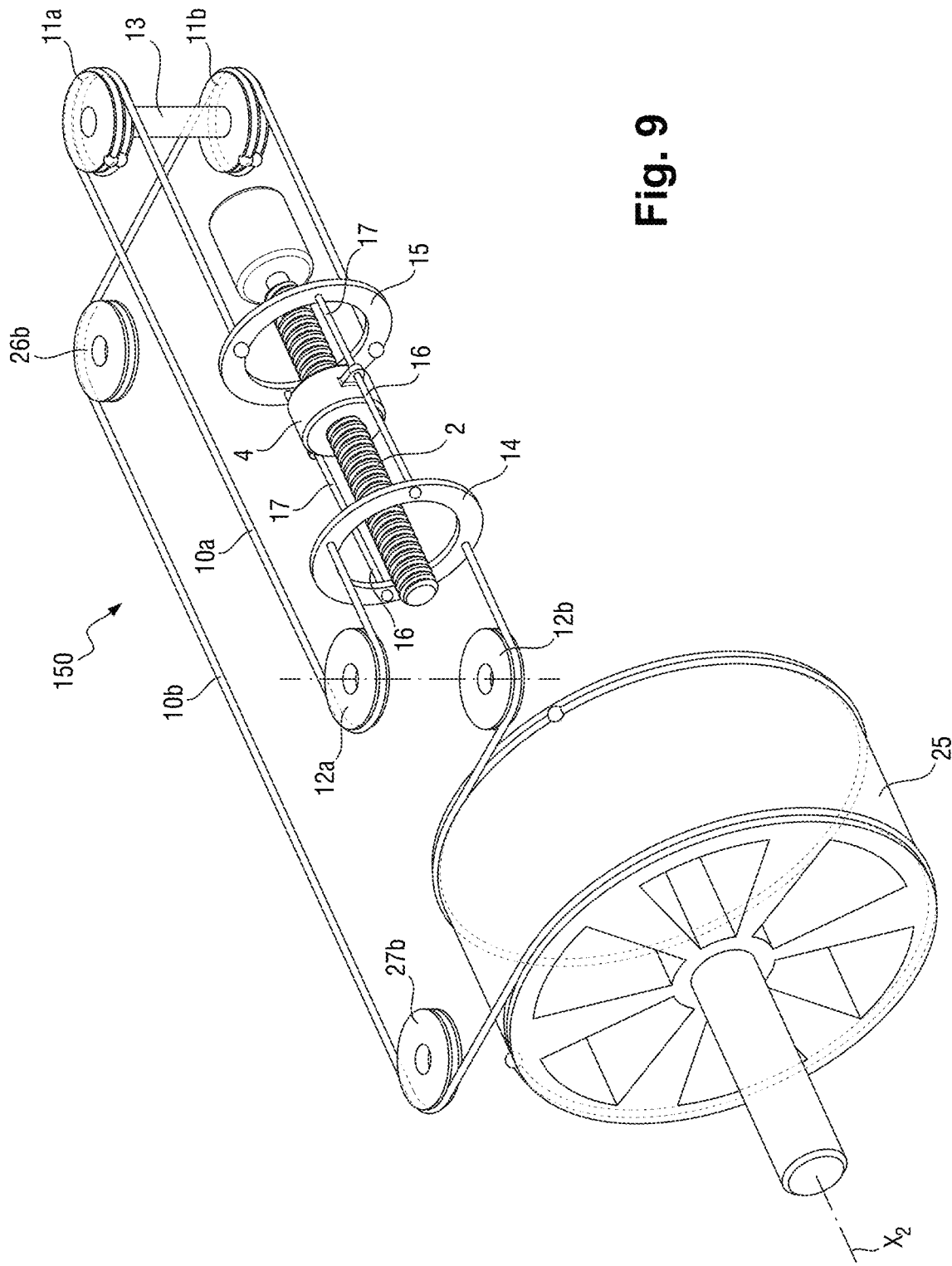
FIG. 9 is a schematic, perspective view of a cable cylinder according to a first variant of the embodiment of the cylinder of FIG. 8.

In the first variant of this second embodiment, illustrated in FIG. 9, the cable cylinder 150 comprises upstream pulleys 11*a*, 11*b* which are secured to one another by the synchronisation shaft 13. In these two exemplary embodiments, the tensioner(s) can be placed as according to one of the variants of the embodiment illustrated in FIGS. 4 to 7.

In the cylinders of FIGS. 8 and 9, it will be noted that the long cable 10*b* is anchored on the remote pulley 25 which is located in the proximity of the downstream pulley 12*b*. In FIG. 8, the downstream pulley 12*b* serving as a right angle gear of the long cable 10*b*, any sliding of the long cable 10*b* over its downstream pulley 12*b* is prevented, which is secured to the other downstream pulley 12*a*, without it being necessary to make a round turn of the long cable 10*b* around its downstream pulley 12*b*. In FIG. 9, the long cable 10*b* makes a round turn around its upstream pulley 11*b*, which is rotationally secured to the other upstream pulley 11*a*.

Figure 10:
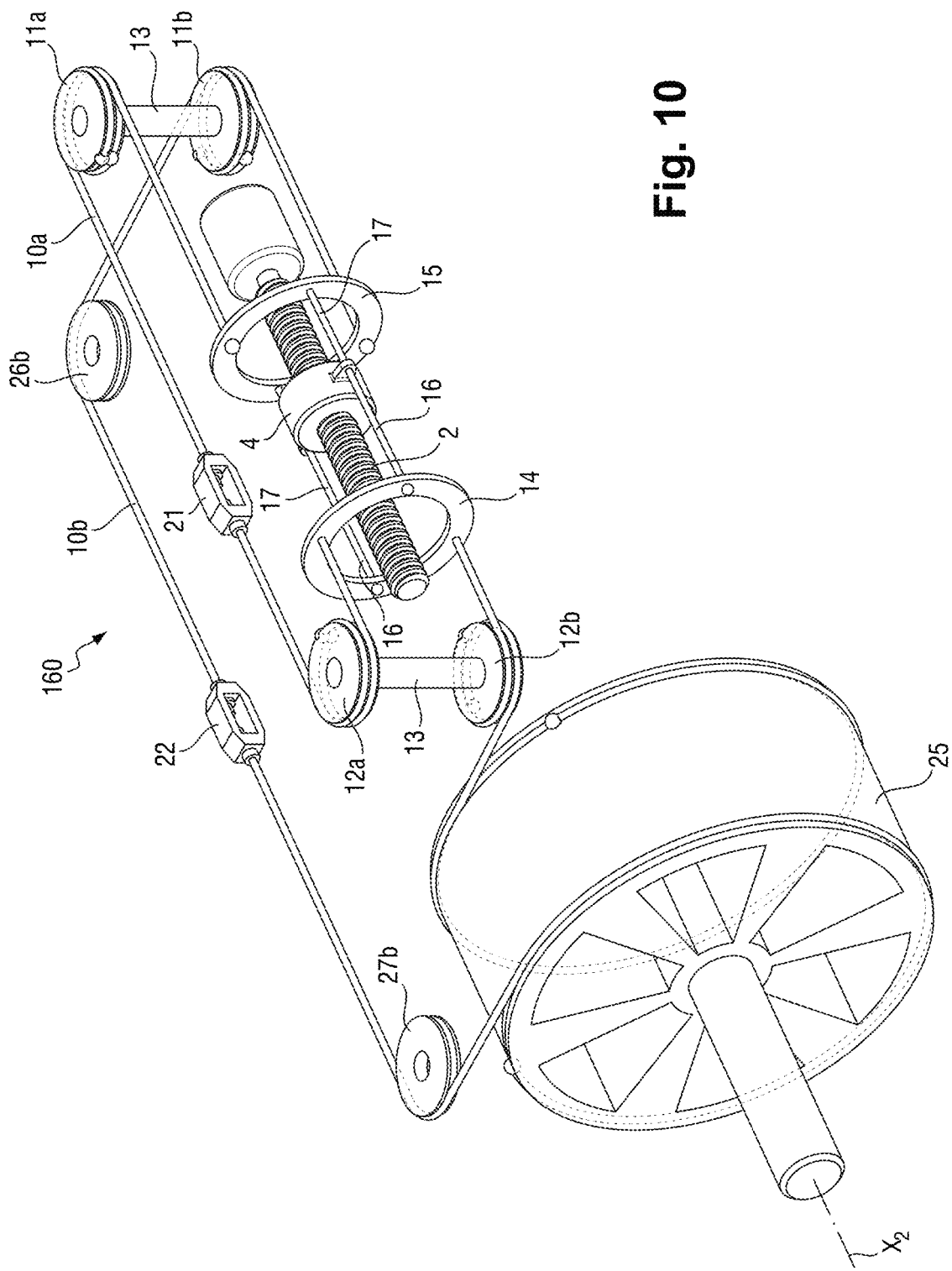
FIG. 10 is a schematic, perspective view of a cable cylinder according to a second variant of the embodiment of the cylinder of FIG. 8.

According to the second variant of the second embodiment, illustrated in FIG. 10, the cable cylinder 160 comprises downstream pulleys 12*a*, 12*b* which are rotationally secured by a synchronisation shaft 13, while the upstream pulleys are rotationally secured by a synchronisation shaft 23. A rigging screw 21 or 22 is installed on the cable 10*a* or 10*b* which, by extending one of these cables, causes a sufficient initial extension to keep the necessary rest tension in all of the strands.

Figure 11:
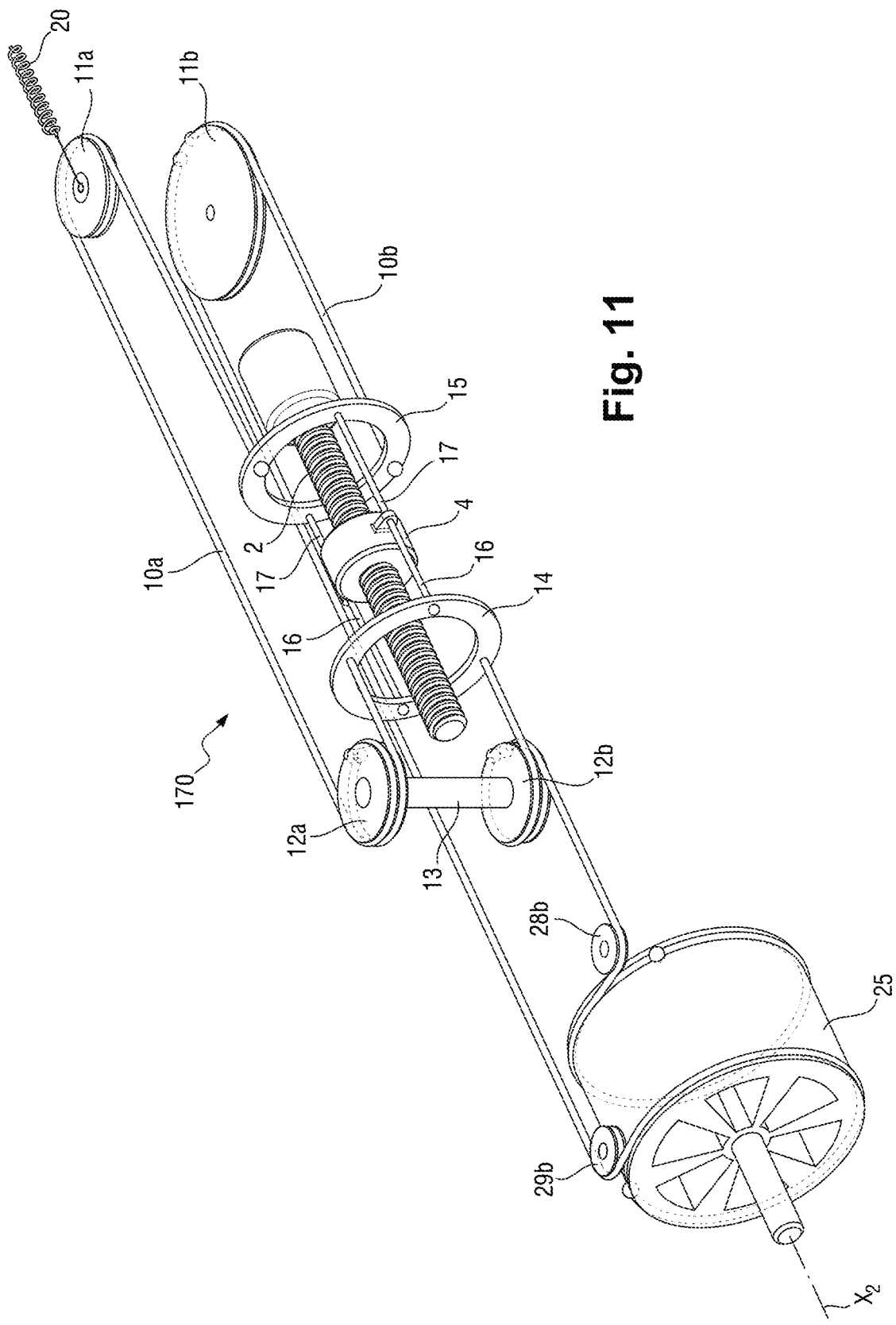
FIG. 11 is a schematic, perspective view of a cable cylinder according to a third particular embodiment of the invention, the cylinder body having been omitted for more clarity.

According now to the third particular embodiment, illustrated to FIG. 11, in which the cable cylinder 170 is also used to make a remote pulley 25 rotate about an axis of rotation X2 that is parallel to the axis of rotation X1 of the screw 2, the upstream pulley 11*b* has been slightly enlarged with respect to the upstream pulley 11*a*, such that it is no longer necessary to return the long cable 10*b* to the front by means of an auxiliary return pulley (like the pulley 26*b* of FIGS. 8 to 10). The long cable 10*b* still makes a round turn around the downstream pulley 12*b*. In this case, to engage the two strands of the long cable 10*b* on the remote pulley 25, two return pulleys 28*b*, 29*b* are used which extend to the immediate proximity of the driven pulley 25.

Figure 12:
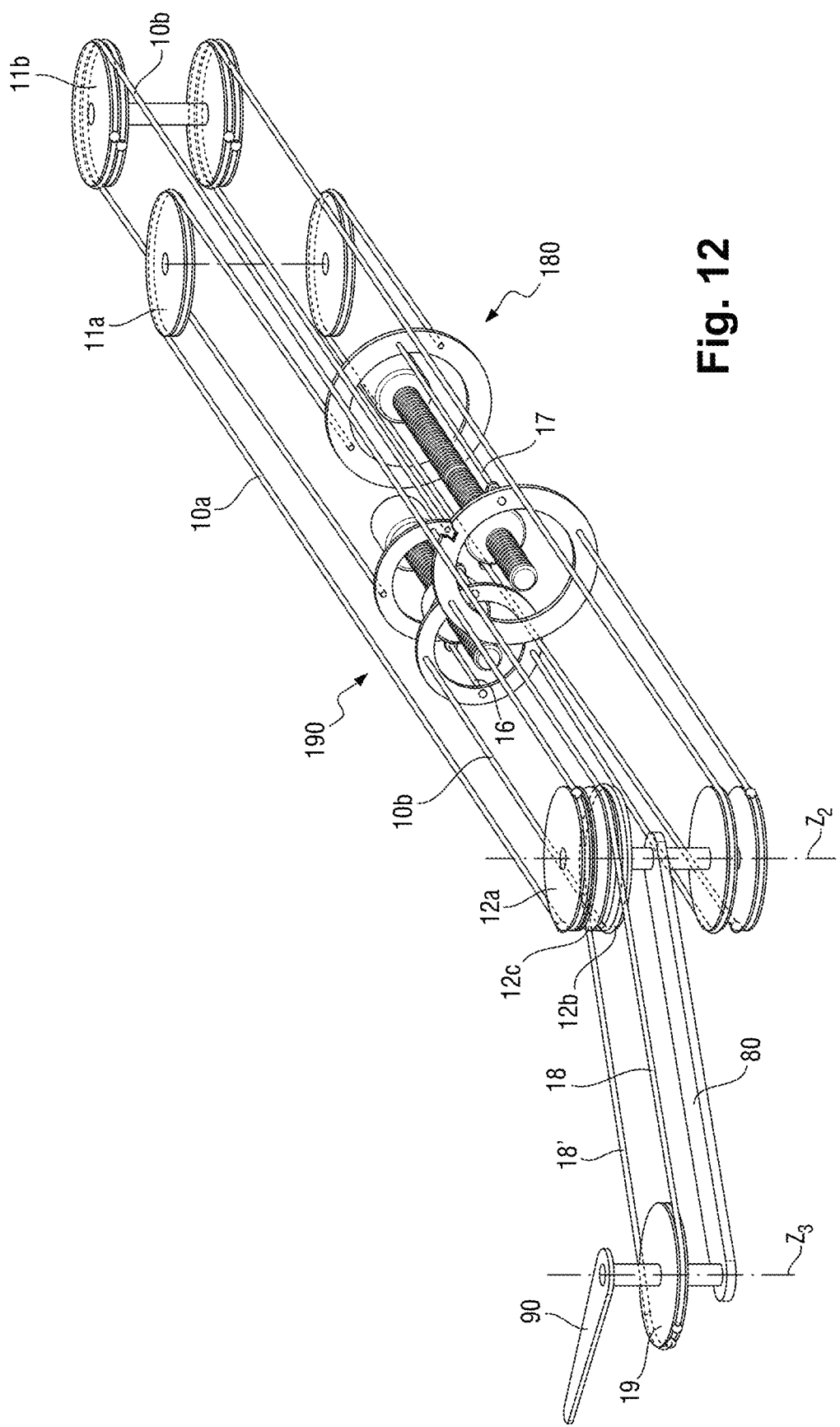
FIG. 12 is a schematic, perspective view of a robotic finger with two phalanges using two cable cylinders, a cable cylinder of which is according to the invention.

The cable cylinder according to the invention lends itself to various applications. One of them consists of actuating phalanges of a finger of a robotic hand. As is seen in FIG. 12, in this case, a first cable cylinder 180 known per se is used (therefore, with two cables of identical length) to actuate a first phalange 80 and a second cable cylinder 190 according to the invention (therefore, with cables of separate lengths) to actuate a second phalange 90.

More specifically, the first phalange 80 has a proximal end pivotingly mounted about an axis Z2 and rotationally secured to one of the downstream pulleys of the first cable cylinder 180. The actuation of the first cable cylinder 180 therefore causes the rotation of this downstream pulley, and therefore the pivoting of the first phalange 80.

The second phalange 90 is rotatably mounted so as to rotate about an axis Z3 that is parallel to the axis Z2 at the distal end of the first phalange 80, to form a finger with two phalanges. The second cable cylinder 190, according to the invention, comprises a long cable 10*b* which has been extended by a strand 18 beyond its downstream pulley 12*b* around which it makes a round turn to drive a remote pulley 19 which is rotatably mounted so as to rotate about the axis of rotation Z3, by being rotationally secured to the second phalange 90. It will be noted that the strand 18' which returns from the remote pulley 19 itself makes a round turn around an auxiliary pulley 12*c* mounted idle along the axis of rotation Z2 of the first phalange 80 and thus serving to guide the long cable 10*b* during the pivotings of the first phalange 80. In this case, the downstream pulleys 12*a*, 12*b*, and the auxiliary pulley 12*c* are rotatably mounted so as to rotate about the axis of rotation Z2 of the first phalange 80.

Thus, the asymmetric cable cylinder 190 according to the invention is, in this case, used to drive a remote pulley 19, the axis of rotation Z3 of which is not fixed, but movable.

It will be noted that the first cylinder 180 and the second cylinder 190 according to the invention are grouped together which facilitates their arrangement in a hand or a robotic arm.

Naturally, the process can be continued and a third cylinder can be added, chosen asymmetric according to the invention, to actuate a third phalange pivotingly mounted about an axis at the distal end of the second phalange, and so on. The long cable of this third cylinder will thus advantageously make round turns around auxiliary pulleys mounted idle along the axes of rotation Z2 and Z3.

The invention is not limited to the above description, but on the contrary covers any variant coming within the scope defined by the claims.

In particular, although the cable cylinders of the invention illustrated in FIGS. 4 to 12 all comprise coupling rings 14, 15 to indirectly attach the cables 10*a*, 10*b* to the nut 4 via the tie rods 16, 17, these rings can dispensed with, and the cables 10*a*, 10*b* can be directly attached to the nut 4.

The invention claimed is:

1. A cable cylinder comprising a body, in which a screw is rotatably mounted so as to rotate about a longitudinal axis by being selectively driven by a motor, a nut cooperating with the screw so as to move in the body due to the rotational movement of the screw, the cylinder comprising a pair of upstream pulleys and a pair of downstream pulleys arranged on either side of the nut, such that in at least one of the pairs, the pulleys are rotationally secured to one another, and two cables each cooperating with one of the upstream pulleys and one of the downstream pulleys so as to define, for each cable, strands that are parallel to the axis of rotation of the screw, which are attached to the nut, wherein one of the cables forms a loop between its upstream pulley and its downstream pulley, while the other of the cables is extended beyond its downstream pulley to cooperate with a remote pulley rotatably mounted so as to rotate about a remote axis of rotation, separate from the axis of rotation of the downstream pulley, the remote pulley forming a return to return the extended cable to the upstream pulley, the extended cable being prevented from sliding over at least that of its upstream or downstream pulley that is rotationally secured.

2. The cable cylinder according to claim 1, wherein the extended cable is prevented from sliding by making at least one round turn around that of its upstream or downstream pulley that is rotationally secured.

3. The cable cylinder according to claim 1, wherein the cables are attached to the nut through coupling rings, themselves attached to the nut by tie rods.

4. The cable cylinder according to claim 1, wherein the upstream pulleys are rotationally secured by means of a synchronisation shaft.

5. The cable cylinder according to claim 1, wherein the downstream pulleys are rotationally secured by means of a synchronisation shaft.

6. The cable according to claim 1, wherein at least one of the cables is equipped with a rigging screw.

7. The cable according to claim 1, equipped with at least one tensioner to pull on one of the upstream or downstream pulleys of one of the cables.

8. The cable cylinder according to claim 1, wherein the remote pulley is rotatably mounted so as to rotate about an axis of rotation that is parallel to the axes of rotation of the upstream and down-stream pulleys.

9. The cable cylinder according to claim 1, wherein the remote pulley is rotatably mounted so as to rotate about an axis of rotation that is parallel to an axis of rotation of the screw.

10. The cable cylinder according to claim 9, wherein two return pulleys return the extended cable to engage it on the remote pulley.

11. The cable cylinder according to claim 1, wherein the strand of the extended cable returning from the remote pulley to its upstream pulley is guided by an auxiliary pulley mounted idle.

12. The cable cylinder according to claim 11, wherein the extended cable makes a round turn around the auxiliary pulley.

13. The cable cylinder according to claim 11, wherein the auxiliary pulley is mounted rotatably idle along the same axis of rotation as the downstream pulley of the extended cable.

* * * * *